Aug. 25, 1959  J. SHUSTER  2,901,086
CARTON FEEDER
Filed May 1, 1958  4 Sheets-Sheet 1

INVENTOR
JOSEPH SHUSTER
BY Cameron, Kerkam & Sutton
ATTORNEYS

INVENTOR
JOSEPH SHUSTER
BY Cameron, Kerkam & Sutton
ATTORNEYS

Aug. 25, 1959

J. SHUSTER 2,901,086

CARTON FEEDER

Filed May 1, 1958

INVENTOR
JOSEPH SHUSTER

BY Cameron, Kerkam & Sutton

ATTORNEYS

Aug. 25, 1959　　　　J. SHUSTER　　　　2,901,086
CARTON FEEDER

Filed May 1, 1958　　　　　　　　　　　　　4 Sheets-Sheet 4

INVENTOR
JOSEPH SHUSTER
BY Cameron, Kerkam & Sutton
ATTORNEYS

United States Patent Office 2,901,086
Patented Aug. 25, 1959

2,901,086

CARTON FEEDER

Joseph Shuster, Santa Cruz, Calif., assignor to General Foods Corporation, White Plains, N.Y., a corporation of Delaware Application May 1, 1958, Serial No. 732,289

10 Claims. (Cl. 198—30)

This invention relates to carton feeders and more particularly to such feeders in which the cartons are automatically fed to means for first aligning them in rows at right angles to the direction of movement, then to means for dividing the rows of cartons into halves with one half of each row or line of cartons being fed further in said direction than the other half, and finally to spaced conveying means moving at right angles to the original direction of motion and each receiving one half of each row of cartons.

In the automatic high speed filling of cases with smaller cartons it is desirable to feed the cartons in parallel single files to the case. The cartons in the parallel single files should be aligned and neither tilted nor cocked so that they feed properly to the case. In the freezing of foods the cartons of foods are usually quick frozen on trays containing a plurality of rows of cartons as for example three rows each containing ten cartons. After quick freezing the cartons are dumped from the trays and the cartons must then be aligned and the lines divided in half, as above described, for movement of the cartons in single file to the case.

The present invention has particular applicability to the alignment of cartons of frozen foods and the division of the lines of cartons into halves with each half line being fed at right angles to its original direction of motion in single file in spaced parallel feed lines to the case filler.

It is therefore an object of the present invention to provide a novel carton feeder which automatically moves a plurality of cartons in a given direction; which aligns a predetermined number of cartons; which divides each line of cartons in half; which moves one half of each line of cartons in single file in a direction at right angles to the original direction of motion; and which moves the other half of each line of cartons in single file in a direction spaced from and parallel to the direction of movement of the first half of each line of cartons.

Another object is to provide a novel carton feeder which divides aligned moving cartons into two parallel rows of cartons moving in single file at right angles to the original direction of motion for high speed automatic case packing.

Another object is to provide such a carton feeder in which the cartons in the parallel single files are accurately aligned and are not tilted or cocked.

Another object is to provide such a carton feeder which is adjustable for various thicknesses of cartons.

Another object is to provide such a carton feeder in which novel corrugated rubber rolls are employed in the alignment of the cartons and in the separation of the cartons into the two single file parallel rows of cartons.

Another object is to provide such a carton feeder which is of relatively simple construction and which is entirely automatic in operation.

Other and further objects of the present invention will appear from the following description of an illustrative embodiment thereof. This embodiment should in no way be construed as defining or limiting the invention and reference should be had to the appended claims to determine the scope thereof.

In the accompanying drawings, in which like reference characters indicate like parts, Fig. 1 is a side elevation of one embodiment of the carton feeder of the present invention showing the relationship of the several components thereof;

*Table and frame assembly*

Figure 1:
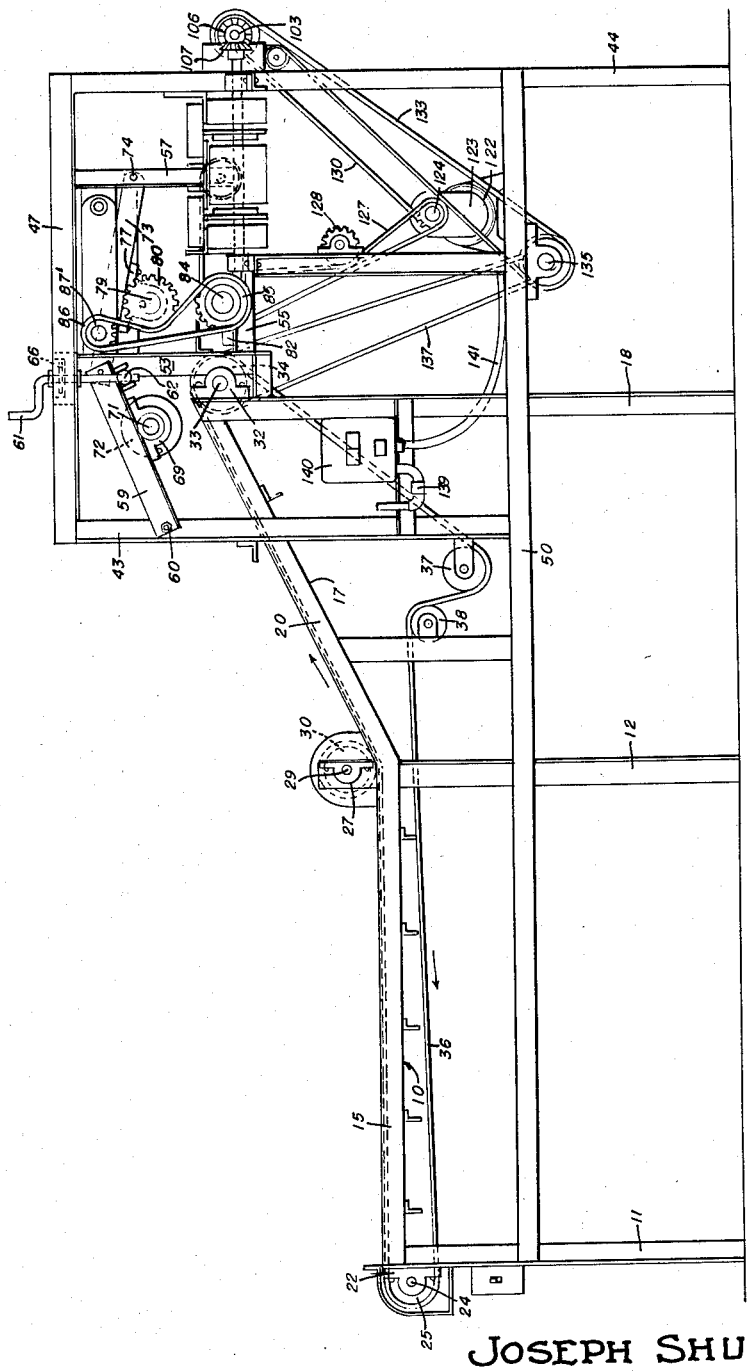
Figure 2:
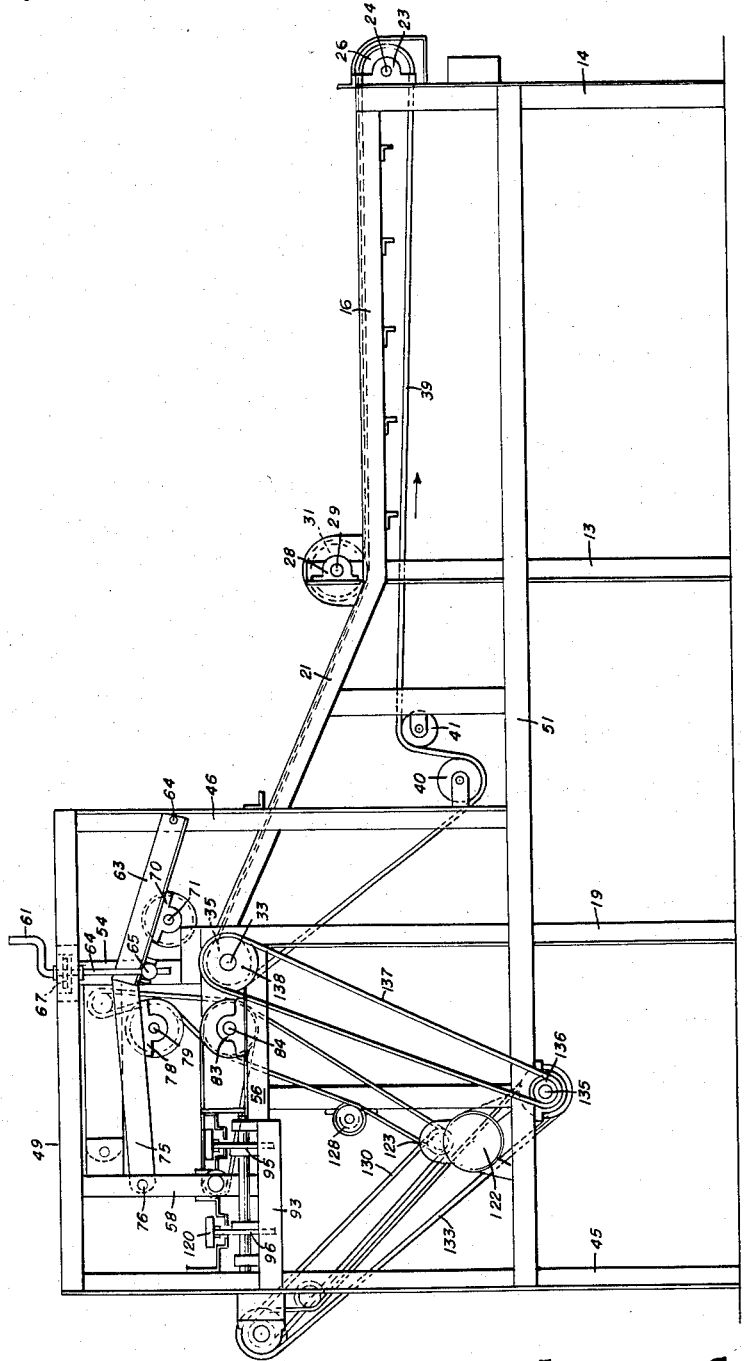
Fig. 2 is a side elevation of the embodiment of Fig. 1 as seen from the opposite side.

Referring now to the several figures, a horizontal table 10 is supported by legs 11, 12, 13, and 14 arranged at the corners thereof. Table 10 is provided with side walls 15 and 16. A ramp 17 leads upwardly from one end of table 10 and is supported at its lower edge by legs 12 and 13 and at its upper edge by legs 18 and 19. Ramp 17 is provided with side walls 20 and 21 which are extensions of side walls 15 and 16, respectively.

Leg 11 supports bearing 22 adjacent its upper extremity and leg 14 carries bearing 23 adjacent its upper extremity, shaft 24 being mounted for rotation in bearings 22 and 23. A sprocket 25 is mounted on shaft 24 adjacent bearing 22 and a sprocket 26 is mounted on shaft 24 adjacent bearing 23. Leg 12 carries bearing 27 above table 10 and leg 13 carries bearing 28 also above table 10. Shaft 29 is mounted for rotation in bearings 27 and 28 and carries sprocket 30 adjacent bearing 27 and sprocket 31 adjacent bearing 28. Leg 18 carries bearing 32 adjacent its upper end and leg 19 carries a similar bearing adjacent its upper end, shaft 33 being rotatably mounted in these bearings. Shaft 33 carries sprocket 34 adjacent bearing 32 and carries sprocket 35 adjacent the bearing on leg 19. Endless chain 36 passes around sprocket 25, passes beneath and engages sprocket 30; passes around sprocket 34; passes beneath idler sprocket 37; and passes over idler sprocket 38. Endless chain 39 passes around sprocket 26, passes beneath and engages sprocket 31; passes around sprocket 35; passes beneath idler sprocket 40; and passes over idler sprocket 41. Any suitable number of flight bars 42 are connected between endless chains 36 and 39 and are arranged at right angles thereto to move over the surface of table 10 in the direction of the arrows in Fig. 3 and to move upwardly over ramp 17.

A suitable framework, including vertical members 43, 44, 45, and 46 connected by horizontal members 47, 48, and 49, respectively, is provided adjacent the upper end of ramp 17 and the entire framework is stiffened and supported by horizontal member 50, 51, and 52. Upright 53 extends between leg 18 and frame member 47 and a corresponding upright 54 extends between leg 19 and frame member 49. Horizontal frame member 55 extends from leg 18 toward leg 44 and a corresponding horizontal frame member 56 extends from leg 19 toward leg 45. Upright 57 depends from frame member 47 parallel to upright 53 and a corresponding upright 58 depends from frame member 49 parallel to upright 54.

*Feed roll construction*

Bar 59 is pivoted to upright 43 at 60 and its opposite end is adjustably positioned by crank 61 which is rotatably mounted in frame member 47 and is threaded through nut 62 which engages the underside of bar 59. A corresponding bar 63 is pivoted at 64 to upright 46 and the other end of bar 63 is adjusted in position by threaded rod 64 which engages nut 65 which is positioned beneath bar 63. Crank 61 is provided with sprocket 66 and rod 64 is provided with sprocket 67 with an endless chain 68 driving the sprockets so that rotation of crank 61 rotates rod 64.

Figure 3:
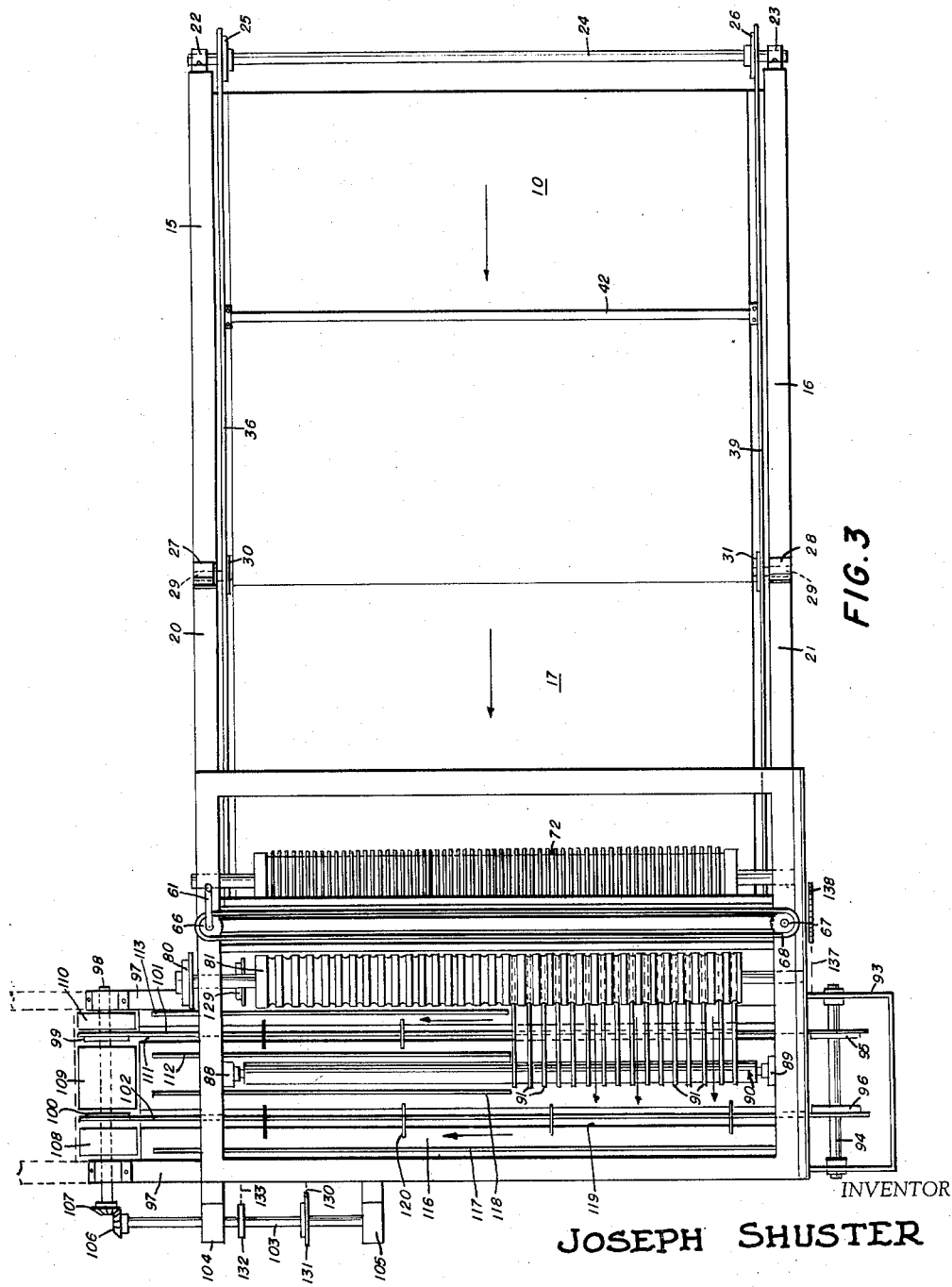
Fig. 3 is a view from above of the embodiment of Fig. 1.
Figure 4:
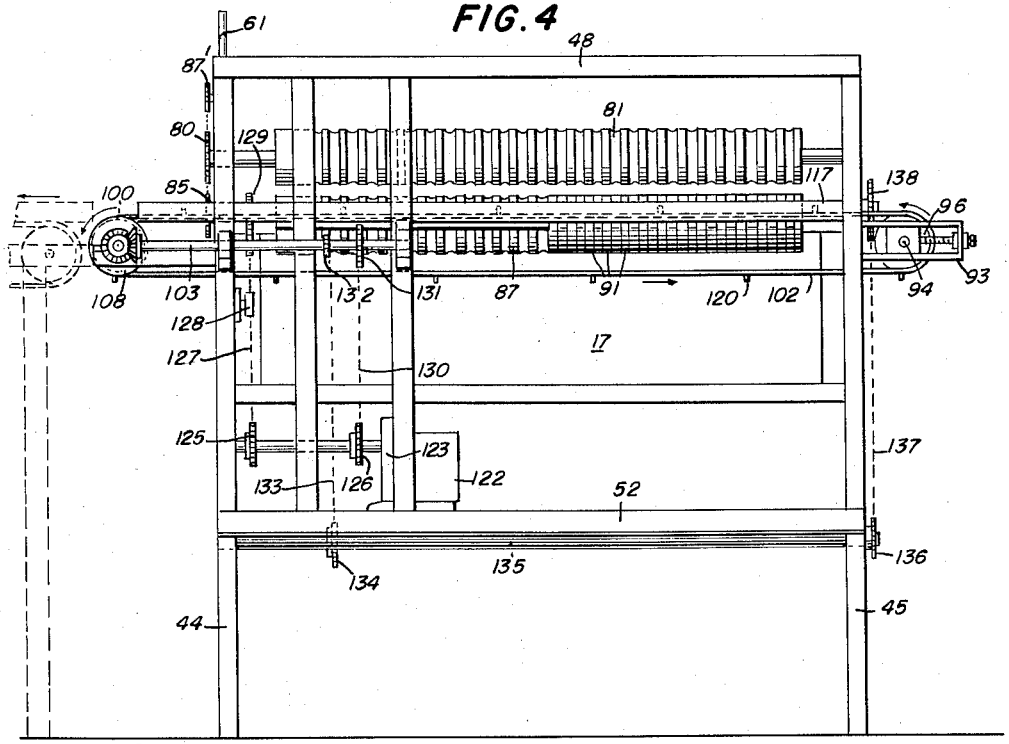
Fig. 4 is an end view as seen from the right in Fig. 1.

Bar 59 carries bearing 69 and bar 63 carries bearing 70 with shaft 71 mounted for rotation in these bearings. A corrugated idler roll 72 of suitable material such as rubber is mounted on shaft 71 and, as best seen in Fig. 3, roll 72 has the corrugations thereof extending parallel to the direction of motion of chains 36 and 39 and hence parallel to the motion of any cartons moved over table 10 and up ramp 17 by flight bars 42. The ribs formed by the corrugations in roll 72 are resilient and compensate for any variations in height of the filled cartons and force the cartons to travel in the direction of the planes of the ribs. Roll 72 brings each row of cartons presented thereto into alignment and introduces the cartons uniformly to the accelerator rolls which will be described hereinafter.

Rotation of crank 61 and corresponding rotation of shaft 64 adjusts the positions of shaft 71 and of roll 72 with respect to the upper end of ramp 17 thus setting roll 72 for various thicknesses of cartons.

Bar 73 is pivoted at 74 to upright 57 and is articulated to bar 59 as by pin and slot construction (Fig. 5) for movement therewith. Bar 75 is pivoted at 76 to upright 58 and is similarly articulated to bar 63 for movement therewith. Bar 73 carries bearing 77 and bar 75 carries bearing 78 with shaft 79 rotatably mounted therein. Shaft 79 carries sprocket 80 adjacent bearing 77 and upper accelerator roll 81 is mounted on shaft 79 within bearings 77 and 78. Accelerator roll 81 is made of suitable resilient material such as rubber and the surface thereof is corrugated in planes parallel to the corrugation of roll 72.

Bearing 82 is mounted on horizontal member 55 and bearing 83 is mounted on horizontal member 56 with shaft 84 mounted for rotation therein. Shaft 84 carries sprocket 85 adjacent bearing 82 and chain 86 drives sprockets 80 and 85, passing around idler sprocket 87' which is mounted on arm 145 which is pivoted at 146 to upright 57. Spring 147 resiliently supports the other end of arm 140. Lower accelerator roll 87 is mounted on shaft 84 between bearings 82 and 83. Lower accelerator roll 87 is made of any suitable resilient material such as rubber and is corrugated in planes parallel to the corrugations of rolls 72 and 81.

Since bar 73 is articulated with bar 59 and since bar 75 is articulated with bar 63 rotation of crank 61 to adjust roll 72 for various thicknesses of cartons also adjusts the position of roll 81 with respect to roll 87 in corresponding manner.

Conveyor construction

Referring now more particularly to Fig. 3, bearing 88 is mounted on frame member 55 and bearing 89 is mounted on frame member 56 with idler shaft or roll 90 extending therebetween and mounted for rotation therein. A plurality of V-belts 91 are mounted in the corrugations of roll 87 and extend around shaft 90. Substantially one half the length of roll 87 is occupied by V-belts 91.

A frame 93 extends from horizontal frame member 56 and leg 45 and shaft 94 is journalled for rotation therein. Shaft 94 carries spaced sprockets 95 and 96 for rotation therewith. A frame 97 is secured to horizontal frame member 55 and leg 44 opposite frame member 93 and shaft 98 is journalled for rotation therein. Shaft 98 carries sprocket 99 opposite sprocket 95 and sprocket 100 opposite sprocket 96. An endless chain 101 is mounted around sprockets 95 and 99 and the upper run thereof passes between the upper and lower runs of V-belts 91 (see Fig. 5). Endless chain 102 passes around sprockets 96 and 100 and extends parallel to and is spaced from chain 101 beyond the ends of the V-belts and shaft 90.

Shaft 98 is rotated by shaft 103, which is suitably driven as will appear more fully hereinafter, and shaft 103 is mounted for rotation in extensions 104 and 105 of the frame assembly. Shaft 103 carries bevel gear 106 which meshes with bevel gear 107 carried by shaft 98. Conveying rollers 108, 109, and 110 are mounted on shaft 98 and are of substantially the same diameter as sprockets 99 and 100 plus the thickness of chains 101 and 102.

A trough-shaped conveyor bed 111 is supported by horizontal frame members 55 and 56 and is provided with upstanding flanges or edges 112 and 113. The upper run of chain 101 travels in valley 114 of trough 111, Fig. 5, and pusher plates 115 carried by chain 101 move through bed 111. A second conveyor bed 116 is supported by horizontal frame members 55 and 56 and extends parallel to and is spaced from bed 111. Bed 116 is provided with upstanding side flanges or edges 117 and 118 and with a central valley 119 in which the upper flight of chain 102 runs. Pusher plates 120 are carried by chain 102 and travel through bed 116.

Figure 5:
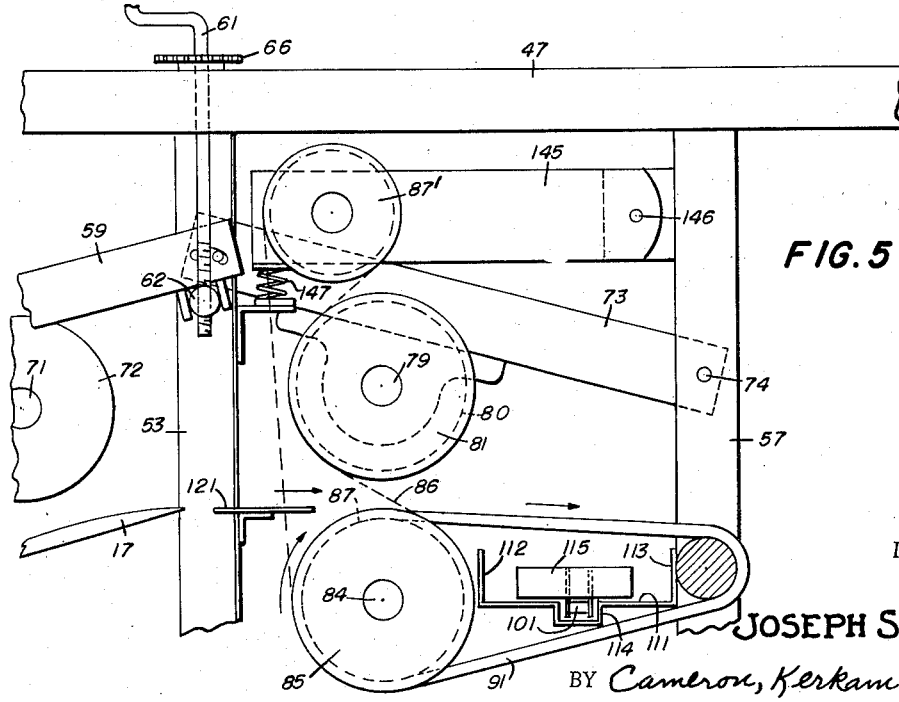
Fig. 5 is an enlarged detail of a portion of the embodiment of Fig. 1 showing the mechanism for adjusting the spacing of the rolls for cartons of various thicknesses.

As best seen in Fig. 5, an intermediate table member 121 is mounted between uprights 53 and 54 to span the distance between the upper edge of ramp 17 and the nip of accelerator rolls 81 and 87.

Driving mechanism

A suitable electric motor 122 is mounted between frame members 50 and 51 and is provided with a suitable reduction gear 123 which drives shaft 124 on which sprockets 125 and 126 are mounted. Sprocket 125 drives endless chain 127 one flight of which passes beneath idler sprocket 128 and chain 127 engages sprocket 129 on shaft 84 to rotate accelerator rolls 81 and 87. Sprocket 126 drives endless chain 130 which passes around sprocket 131 on shaft 103 to rotate shaft 98 and drive conveyor chains 101 and 102. A second sprocket 132 is mounted on shaft 103 and drives endless chain 133 which passes around sprocket 134 on shaft 135. Shaft 135 is journalled for rotation in horizontal frame members 50 and 51 and carries sprocket 136 adjacent frame member 51. Sprocket 136 drives endless chain 137 which passes around sprocket 138 to rotate shaft 33 to actuate endless chains 36 and 39 to move flight bars 42 over table 10 and up ramp 17 in the direction of the arrows in Fig. 3.

Motor 122 is energized by electricity from any suitable source 139 and control is provided by switch box 140 leading to motor 122 through cable 141.

Operation

The operation of the above described illustrative embodiment of this invention should now be apparent. When motor 122 is energized flight bars 42 move over table 10 and up ramp 17; accelerator rolls 81 and 87 are rotated; V-belts 91 are moved in the direction of the arrows in Figs. 3 and 5; and conveyor chains 101 and 102 with their associated pusher plates 115 and 120, respectively, are moved in the direction of the arrows of Fig. 3. When a tray of cartons as above described containing three rows of cartons of ten cartons each is dumped on table 10 so that the long length of the rows of cartons is at right angles to the direction of motion of flight bars 42 a flight bar 42 will engage the rows of cartons and move them over table 10 and up ramp 17. Movement of the cartons over table 10 and up ramp 17 tend to align the cartons at right angles to their direction of movement. The first line of ten cartons then engages idler roll 72 and the corrugations thereof further align the cartons. The aligned cartons of the row continue movement over the intermediate table member 121 and are then engaged between upper and lower accelerator rolls 81 and 87 which move the cartons at increased speed toward the left in Fig. 3. One half of each row of cartons is projected from accelerator rolls 81 and 87 into conveyor bed 111 where they are engaged by pusher plates 115 and moved off in single file in the direction of the arrow in Fig. 3.

The other half of each row of cartons passes through the accelerator rolls 81 and 87 and are moved by V-belts 91 to conveyor bed 116 where they are engaged by pusher plates 120 and moved off in the direction of the arrow in Fig. 3. The aligned cartons in parallel single files may be conveyed by pusher plates 115 and 120, directly to the case packer or intermediate conveying means may be employed, as required.

Cartons of various thicknesses may be accommodated in the invention by suitable rotation of handle 61 to adjust the distance between idler roll 72 and the upper end of ramp 17 which automatically adjusts the distance between accelerator rolls 81 and 87.

It should now be apparent that the present invention in every way satisfies the several objectives discussed above.

Changes in or modifications to the above described illustrative embodiment of this invention may now be suggested to those skilled in the art without departing from the present novel concept. Reference should therefore be had to the appended claims to determine the scope of the invention.

What is claimed is:

1. In a carton feeder having a carton receiving table, an upwardly inclined extension for said table and pusher means for moving the cartons across the table and up the inclined extension, an idler roll spaced from and extending across the upper end of the inclined extension said roll having resilient peripheral corrugations at right angles to the length thereof, a lower accelerator roll spaced from and parallel to the upper end of the inclined extension having resilient peripheral corrugations at right angles to the length thereof, an upper accelerator roll spaced from and parallel to said lower accelerator roll having resilient peripheral corrugations at right angles to the length thereof, means for rotating said rolls to feed cartons therebetween, a conveyor adjacent and parallel to said lower accelerator roll, a second conveyor spaced from and parallel to said first conveyor, means for moving said conveyors in the same direction along the length of said accelerator rolls, an idler shaft between said conveyors, and a plurality of spaced endless belts passing around said lower accelerator roll in corrugations therein and around said idler shaft, said spaced endless belts extending over approximately one half the length of said lower accelerator roll and embracing the corresponding length of said first conveyor.

2. In a carton feeder as described in claim 1, a horizontal plate adjacent the upper edge of the inclined extension extending the length of and terminating adjacent to said lower accelerator roll.

3. In a carton feeder as described in claim 1, each of said conveyors comprising a bed having parallel upstanding walls, a valley in the bottom of said bed, a conveyor element moving in said valley, and a plurality of pusher plates secured to said element for movement in and along said bed.

4. A carton feeder as described in claim 1 including means for simultaneously adjusting the spacing of said idler roll with respect to the inclined extension and the spacing of said upper accelerator roll with respect to said lower accelerator roll comprising pivoted frame means supporting said idler roll, second pivoted frame means supporting said upper accelerator roll, and manually actuated means for rotating said frames on said pivots.

5. A carton feeder as described in claim 1, said means for rotating said accelerator rolls including a sprocket rotated by said lower accelerator roll, a second sprocket for rotating said upper accelerator roll, a resiliently mounted idler sprocket and an endless chain passing around said first sprocket and around said idler sprocket and engaging said second sprocket.

6. A carton feeder as described in claim 1 including means for simultaneously adjusting the spacing of said idler roll with respect to the inclined extension and the spacing of said upper accelerator roll with respect to said lower accelerator roll comprising a pivoted frame supporting said idler roll, a second pivoted frame supporting said upper accelerator roll, a manually rotatable threaded shaft, and a traveller mounted on said shaft and engaging said frames whereby rotation of said shaft will rotate said frames and move said rolls.

7. In a carton feeder having a carton receiving surface and means for moving the cartons across the surface, spaced upper and lower accelerator rolls adjacent to and receiving cartons from the surface, means for rotating said accelerator rolls, said rolls having resilient surfaces peripherally corrugated at right angles to the lengths thereof, a pair of spaced parallel conveyors adjacent to and parallel with the length of said lower accelerator roll, an idler shaft between and parallel to said conveyors, and a plurality of endless belts engaging corrugations in said lower accelerator roll and passing around said idler shaft, said belts extending for approximately one half the length of said lower accelerator roll and embracing the corresponding length of the adjacent one of said conveyors.

8. A carton feeder as described in claim 7 in which each of said conveyors includes a bed having spaced parallel upstanding walls and a plurality of pusher plates mounted for movement in and along said bed.

9. A carton feeder as described in claim 7 including manually actuated means for adjusting the spacing of said upper accelerator roll with respect to said lower accelerator roll.

10. A carton feeder as described in claim 7 in which said means for rotating said accelerator rolls include a sprocket rotated by said lower accelerator roll, a sprocket rotating said upper accelerator roll, a pivot arm, spring means supporting said arm, an idler sprocket on said arm and an endless chain passing around said first sprocket and said idler sprocket and engaging said second sprocket.

References Cited in the file of this patent

UNITED STATES PATENTS 1,528,062     Koerner  ---------------- Mar. 3, 1925